Nov. 21, 1939.    H. E. SIPE    2,180,556
TIRE SLITTING MACHINE
Filed Nov. 26, 1938
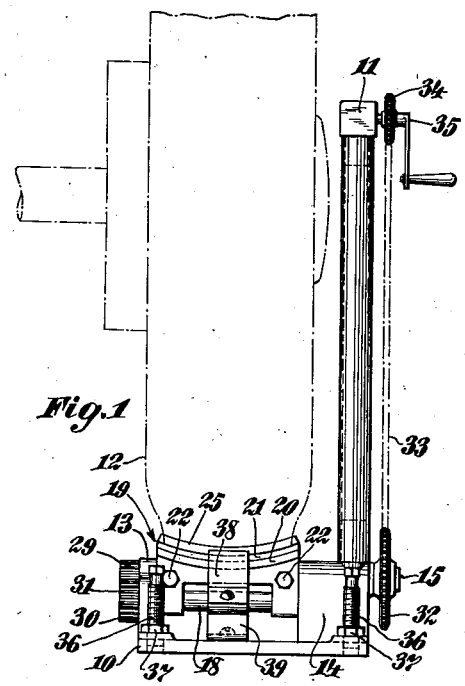
Fig.1
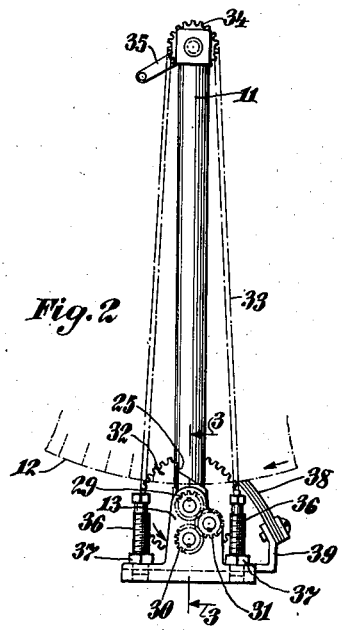
Fig.2
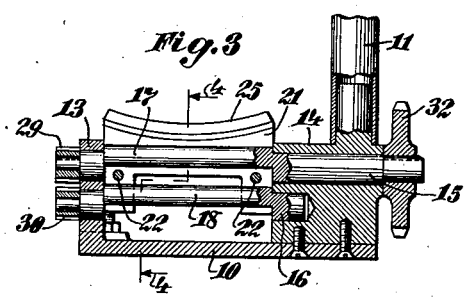
Fig.3
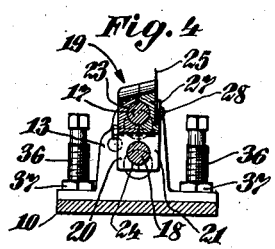
Fig.4
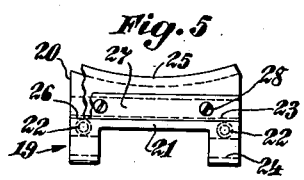
Fig.5
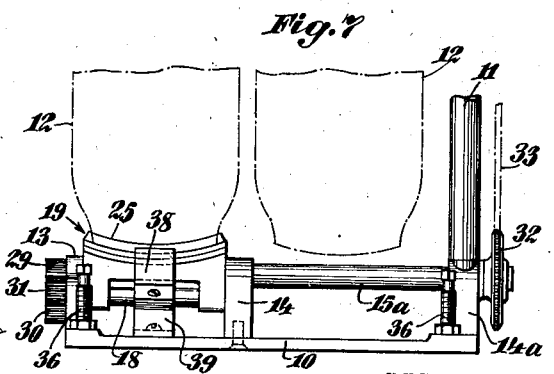
Fig.6
Fig.7
INVENTOR.
Harry E. Sipe,
BY
ATTORNEY.

Patented Nov. 21, 1939

2,180,556

UNITED STATES PATENT OFFICE 2,180,556

TIRE SLITTING MACHINE

Harry E. Sipe, New York, N. Y.

Application November 26, 1938, Serial No. 242,455

8 Claims. (Cl. 164—47)

The invention disclosed herein relates to the cutting of tire treads to improve the tractive character of the same.

Special objects of the invention are to accomplish the cutting or "deskidding" operations to be performed without removing the tire from the wheel and to provide a machine for the purpose, which will be of a light portable character, which can be quickly and accurately set in position and which will rapidly and efficiently cut the slits in desired angular and spaced relation.

Other objects of the invention are to provide a tire slitting machine, which will be particularly simple and inexpensive, automatic in action and which will be of a universal character, adapted to the various types of tires and to various special situations, such as either single or dual tires.

The foregoing and other desirable objects are attained in this invention by the novel features of construction, combinations and relations of parts, hereinafter described, illustrated in the accompanying drawing and broadly covered in the claims following.

The drawing illustrates certain practical commercial embodiments of the machine, but structure may be modified and changed as regards the present disclosure, as will be realized from the broad scope of the claims.

Fig. 1 is a front or face view of the machine placed in cooperative relation to the tire on a vehicle wheel, the latter indicated in broken lines.

Fig. 2 is a side or edge view of the machine as seen from the left in Fig. 1.

Fig. 3 is an enlarged and broken sectional view as on substantially the plane of line 3—3 of Fig. 2.

Fig. 4 is a sectional view as on line 4—4 of Fig. 3.

Fig. 5 is a detached view of the knife carrier, with the knife and securing plate broken away at one end.

Fig. 6 is a diagrammatic view illustrating the cutting action of the knife.

Fig. 7 is a front view illustrating modification of the machine for dual tires, with parts of the machine shown broken away.

Prior to this invention, deskidding operations have required that the tire be mounted in a special stand carrying the necessary cutting equipment. This has required that a tire in service be first removed from the wheel, be mounted on the stand and then after cutting, be returned to the wheel. This necessary handling of heavy tires is objectionable and costly.

The present invention involves an entire departure from previous practice, in that the tires are left in place on the wheels and the machine is so designed that it can be easily carried about, slipped into position beneath the tire of a wheel that has been jacked up off the floor and then be operated to quickly cut and to space the tire between the cuts.

The machine shown consists of a simple flat base 10, carrying the tire cutting and holding parts and provided with an upstanding column 11, affording a convenient handle by which the device may be shifted about, lined up and accurately located beneath the rim of a tire on a wheel which has been jacked up as indicated at 12, in Figs. 1, 2, 6 and 7.

On the base are spaced bearing standards 13, 14, in which are journalled, one above the other, parallel upper and lower shafts 15, 16. These shafts have eccentric crank portions 17, 18, between the spaced bearings and in this space between the bearings and engaged over said eccentric portions is a knife carrier 19.

The knife carrier is shown as made up of confronting blocks 20, 21, secured together by bolts 22, and having between them complemental portions of bearings 23, 24, for the eccentric crank portions 17, 18.

As shown particularly in Figs. 1 and 3, the ends of the knife carrier and the inner ends of the spaced bearings 13, 14, are faced off smooth and parallel, so that the knife carrier is guided and confined against endwise movement while being vertically reciprocated in the circular path defined by the parallel cranks.

The knife for cutting the slits is indicated at 25, secured in a shouldered portion 26, of the carrier block 21, by an overstanding clamp plate 27 and screws 28. This knife may be of any shape and size, depending upon the character of slit to be cut and need not conform or bear any special relation to the transverse profile of the tire tread.

Like rotative movement of the shafts in the same direction is maintained in the illustration by means of pinions 29, 30, on the two shafts in engagement with intermediate synchronizing pinion 31.

Drive is imparted to the carrier in the illustration by means of sprocket gear 32, on the outer end of upper shaft 15, engaged by sprocket chain 33, extending over a sprocket 34, carried by the hand crank 35, journalled in the head at the upper end of the column 11. This construction locates the crank at a level convenient for turning and above and clear of the knife mechanism.

For purposes of levelling and anchoring the base, set screws 36, are shown seated in the base and adapted to be turned down, through the base and held by lock nuts 37.

To hold the tire under control while the knife is working and during the indexing or spacing movements, a friction brake is illustrated consisting of rubber or fabric layers 38, carried by bracket 39, on the base and engaging the rim of the tire, inclined in the direction of wheel rotation, Fig. 2.

Fig. 6 illustrates the circular paths traversed by the similarly rotating cranks and the arcuate path traversed by the cutting edge of the blade on the vertically and laterally shifting carrier. As shown at the left, the blade enters the rubber of the tread on its upward stroke. As it travels upwardly and laterally in its curved path of movement, it cuts deeper and at the same time rotates the wheel, continuing such indexing movement from the point of deepest cut in the central diagram until it leaves the tire as indicated at the right. Thus in the act of making the incision and then withdrawing from the cut, the knife shifts the tire forward into position ready for the next cut. The brake 38 is faced to permit this advancing movement but holds the tire firmly enough to prevent objectionable over-riding at the end of the advancing movement. The tire then remains stationary, held so by the brake, while the blade is further retracted and carried through the lower half of the circle back into the position of starting the next cut.

This method of automatic indexing is simple and direct and leaves the tire free to be turned forwardly by hand for increasing or varying the spacing between the cuts, or for inspection or other purposes.

For dual tires, the machine may be extended as indicated in Fig. 7, to enable it to reach in under the outer tire, into position for cooperation with the inside tire. In the illustration, this is accomplished by simply making the base and shafting longer or deep enough to reach in behind the first tire into position for cooperation with the inside tire of a pair. The structure otherwise is generally the same, except that an additional outer bearing 14a, preferably is provided for the extended upper shaft 15a.

With the flat base and the cutting mechanism mounted low on the base to pass easily into position beneath the tire on a raised wheel, the device is particularly stable and easy to handle and operate. The upstanding column provides a particularly convenient means for shifting and placing the machine in position and the location of the hand crank at the head of the column brings the operating means up into convenient and handy position for actuation without tiring effort. If desired, motor drive may be added or substituted in place of the manually operable mechanism. The upstanding column further is of aid in lining up the device with the wheel, this column usually projecting high enough to reach up to or beyond the hub of the wheel which then provides the center with respect to which the device may be adjusted, for instance to cut either approximately radial incisions or incisions at a predetermined angle in relation to the radii. This column also provides a convenient means for holding the machine firmly down on the floor and in desired fixed position with one hand, while turning the crank with the other hand. For such purpose, the upper end of the column may be rounded or finished off in the form of a suitable handle or hand grasp.

What is claimed is:

1. A tire slitting machine, comprising a low flat base adapted to be entered beneath the tire of a jacked up wheel, cranks rotating in the same direction on parallel axes on said base, a reciprocating knife carrier carried by said cranks, a tire slitting knife mounted on said carrier, means for conjointly operating said cranks and an upstanding column on the base, said operating means including a hand crank at the head of said column and connecting gearing from said hand crank to said blade carrier cranks.

2. A tire slitting machine, comprising horizontally disposed companion cranks on parallel axes, a tire slitting blade carried by said cranks, means for driving said cranks in unison in the same direction to reciprocate said blade in a circular path for cutting into a rotatably supported tire, indexing the same and then withdrawing from the cut and a tire engaging brake for restraining and controlling the tire indexing movements.

3. A tire slitting machine, comprising horizontally disposed companion cranks on parallel axes, a tire slitting blade carried by said cranks, means for driving said cranks in unison in the same direction to reciprocate said blade in a circular path for cutting into a rotatably supported tire, indexing the same and then withdrawing from the cut and a tire engaging brake inclined in the direction of tire indexing movements.

4. A tire slitting machine, comprising a base having spaced bearings, shafts journalled in parallel relation in said bearings and having cranked portions in the space between the bearings, a knife carrier in the space between said bearings and having bearings receiving said cranked portions of the shafts, said spaced shaft bearings having opposed parallel guide faces and the ends of said knife carrier slidingly engaging said parallel guide faces and whereby said knife carrier is confined against endwise movement while being reciprocated by said parallel cranked portions, a tire slitting knife on said carrier and means synchronously rotating the shafts in the same direction.

5. A tire slitting machine, comprising a base having spaced bearings, shafts journalled in parallel relation in said bearings and having cranked portions in the space between the bearings, a knife carrier slidable in the space between said bearings and having bearings receiving said cranked portions of the shafts, a tire slitting knife on said carrier, means synchronously rotating the shafts in the same direction and an upstanding column on said base, said operating means including a hand crank at the head of said column and drive connections from said hand crank to said shafts.

6. A tire slitting machine, comprising a base for support on a floor beneath a jacked up tire, a column projecting upward from said base and provided with a hand grasp portion at the upper end of the same by which the base may be positioned and held, a tire slitting knife mounted on the base for generally vertical movement and operating means for said knife including a hand crank mounted on said column adjacent said hand grasp portion and drive connections from said hand crank to said movable knife.

7. A tire slitting machine, comprising a base, companion cranks journalled on substantially parallel axes on said base, a tire slitting blade carried by said cranks, means for driving said cranks in unison in the same direction to reciprocate said blade for cutting into and withdrawing from a supported tire and adjustable screw means for variably positioning and supporting said base to properly correlate said reciprocable blade in respect to a supported tire.

8. In combination, a tire and a tire slitter mounted for relative travel longitudinally of the tire tread, said slitter including a tire slitting blade, cranks journalled in parallel relationship and geared together for simultaneous rotation in the same direction, a blade carrier mounted on said cranks, means for securing said tire slitting blade on said blade carrier and means for effecting the rotation of said cranks to cause said blade to enter the tread, effect relative indexing movement of said tire and tire slitter through engagement of the blade in the tire, and retreat of the blade from the slit formed in the tire at the end of such indexing movement.

HARRY E. SIPE.